(No Model.)

H. OTTO.
TRUCK BRASS CHUCK.

No. 341,767. Patented May 11, 1886.

WITNESSES
J. Henry Kaiser
Harry L. Ames

INVENTOR
Henry Otto
by J. Snowden Bell
atty.

UNITED STATES PATENT OFFICE.

HENRY OTTO, OF BLOOMINGTON, ILLINOIS.

TRUCK-BRASS CHUCK.

SPECIFICATION forming part of Letters Patent No. 341,767, dated May 11, 1886.

Application filed December 31, 1885. Serial No. 187,200. (No model.)

*To all whom it may concern:*

Be it known that I, HENRY OTTO, of Bloomington, in the county of McLean and State of Illinois, have invented certain new and useful Improvements in Truck - Brass Chucks, of which improvements the following is a specification.

My invention relates to chucks for holding the journal bearings or brasses of car and locomotive trucks while being bored out to fit the journals for which they are designed, such operation being usually performed in a lathe or boring-mill, and, as ordinarily practiced, one brass only being bored at a time.
The objects of my invention are, first, to provide a chuck desirably adaptable to use with a boring-bar upon a self-feeding drill-press, in which brasses of different sizes and patterns may be bored in pairs of uniform diameters and depths without the necessity of measurement or adjustment after being fixed in position and without liability to be pressed out of normal shape; second, to insure the truly concentric relation of the chuck to the boring-bar independently of the clamps and bolts by which the chuck is fastened to the face-plate of the machine and to provide for the free escape of chips; and, third, to effectually lubricate the guiding-thimble and socket of the boring-bar, and prevent the access thereto of chips and other foreign matters.

To these ends my invention, generally stated, consists in the combination, with two adjustable jaws adapted to slide upon a supporting-plate and to receive and hold a pair of truck-brasses, of mechanism for closing said jaws centrally upon the brasses, for fixing the adjusted jaws upon a face-plate concentrically with a boring-bar, for carrying off the chips or borings, and for lubricating the boring-bar socket without removing or disturbing the adjustment of the jaws.

Figure 1:
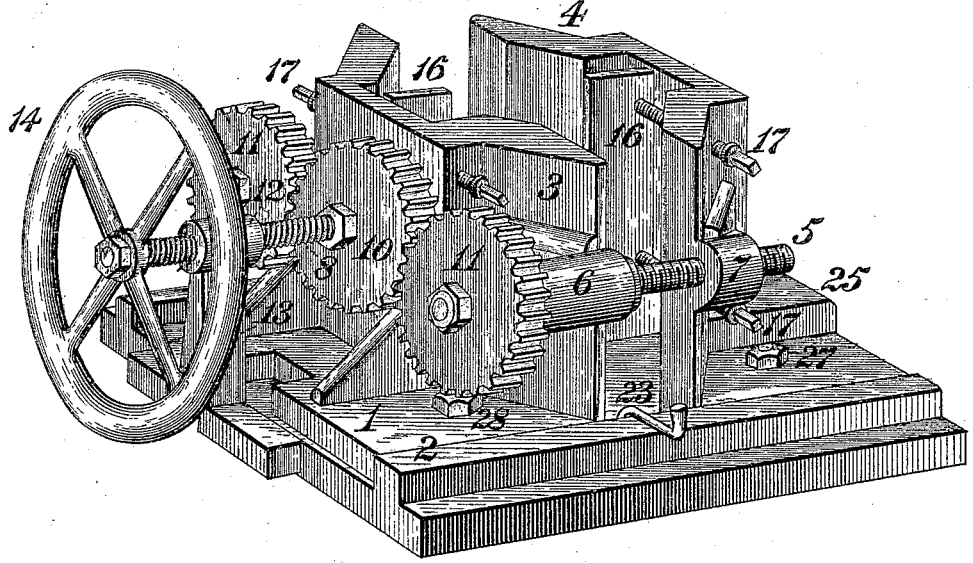
Figure 2:
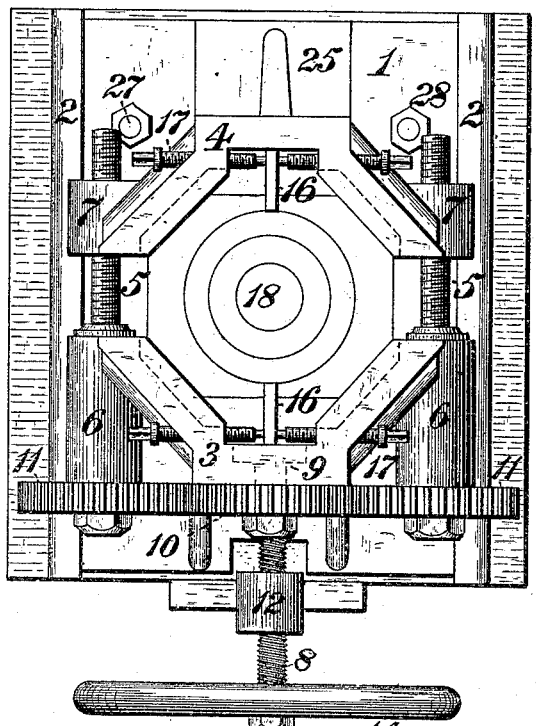
Figure 3:
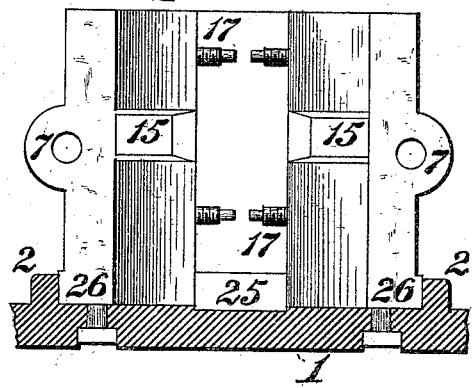
Figure 4:
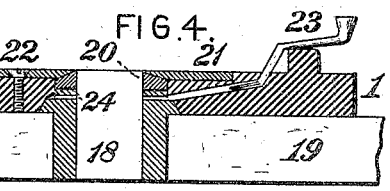

The improvements claimed are hereinafter fully set forth.
In the accompanying drawings, Figure 1 is a view in perspective of a truck-brass chuck embodying my invention; Fig. 2, a plan or top view of the same; Fig. 3, a vertical transverse section through the bed-plate, with the rear jaw in elevation; and Fig. 4, a similar section taken at the center of the boring - bar thimble.

In the practice of my invention I provide a substantial metallic bed or base plate, 1, having lateral guides or flanges 2, between which the front and rear jaws or clamping-sections, 3 4, of the chuck are fitted to slide freely longitudinally. Each of the jaws is three-sided, with its inner side faces at angles of forty-five degrees to the center line of the chuck, so that the jaws may fit the substantially semi-octagonal outline of brasses of the ordinary standard patterns, and a recess or socket, 15, is formed in each of side faces, said recesses being made of sufficient width and depth to receive the outside shoulders of the largest brasses for which the chuck is designed. The jaws are connected by a pair of lateral clamping-bolts, 5 5, each of which is journaled in a bearing, 6, on one side of the front jaw, 3, and engages by a screw-thread a nut, 7, correspondingly located on the rear jaw, 4. The jaws 3 4 are moved toward and from each other to inclose or release a pair of brasses by an adjusting-screw, 8, which is journaled in the longitudinal central plane of the chuck in a bearing, 9, in the front jaw, 3, as indicated in dotted lines in Fig. 2. A spur-gear, 10, fixed upon the adjusting-screw 8, meshes with a similar gear, 11, of equal diameter, upon the forward end of each of the clamping-bolts 5, and the thread of the screw 8, which is cut upon its exterior to its gear 10, and is of reversed lead and of double the number of threads to the inch relatively to the threads of the clamping-bolts, engages a nut, 12, upon the upper end of a standard, 13, fixed upon the bed-plate 1. Rotation is imparted to the adjusting-screw 8 by a hand-wheel, 14, upon its outer end, and by the relation of its thread to those of the clamping-bolts 5 an equal degree of movement will be imparted to the jaws 3 4, toward or from an intermediate central plane, in accordance with the direction of rotation of the adjusting-screw, without inducing end strain upon its standard and nut.

The bearings or brasses, for the boring of which the chuck is designed, invariably present less than a semi-cylindrical bearing-surface—that is to say, in all cases they surround their journals for a distance which is less than the semi-circumference thereof—the space between a pair of brasses for journals of similar diameter, if applied together to a journal, varying from, say, three-sixteenths to about three-quarters of an inch. For the purpose of filling such intervening space I provide a series of pairs of liners or distance-pieces, 16, each pair of which is of proper thickness for one particular size or pattern of brass to be bored. A liner, 16, is adjusted vertically and centrally in each of the jaws 3 4, and is held in position therein by lateral set-screws 17, engaging threads in each side of the jaws 3 4, near their upper and their lower ends, respectively. A pair of liners when adjusted forms part of the chuck in readiness for operation upon one size or pattern of brasses, and is not disturbed, except when other styles of brasses are to be bored, in which case it is removed and another pair of suitable thickness substituted.

The brasses to be bored out are placed in the chuck parallel to its longitudinal central plane, with their inner edges abutting against opposite sides of the liners 16. The jaws are then moved together by rotating the adjusting-screw 8 until each brass is clamped between two outer inclined faces—one on each jaw—and two inner faces—one on each liner—parallel to the longitudinal plane of the chuck. The brasses are thus firmly held in proper relation to a common center without tendency to distortion or being pressed out of shape, and upon proper adjustment a uniform depth of bore is insured without the necessity of additional measurement. A vertical thimble or socket, 18, is fixed in the face-plate 19 of the drill-press on which the chuck is to be used, for the purpose of guiding the boring-bar, said thimble having a conical or tapered head, which enters a corresponding central opening in the bed-plate 1 of the chuck. The thimble insures the chuck being held to the face-plate concentrically with the boring-bar independently of the clamps by which its bed-plate is connected to the face-plate. The top of the thimble 18 is covered by a rubber ring, 20, for preventing access of chips and dirt to the boring-bar, said ring being held in position by a plate, 21, secured to the bed-plate 1 by screws 22.

In order to enable the boring-bar to be properly and conveniently lubricated whenever desired without removing or disturbing the chuck, a lateral oil-pipe, 23, is inserted in the bed-plate, said pipe communicating with a perforated groove or oil-channel, 24, in the thimble 18, below the rubber ring 20. A horizontal channel, 25, is formed at the lower end of the rear jaw, 4, on the top of the bed-plate 1, said passage serving for the escape of chips or borings, to facilitate which the surface of the bed-plate, which forms the bottom of the channel, may be downwardly sloped or inclined toward its rear end.

Four longitudinally-slotted holes, 26, are formed in the bed-plate 1, for the reception of the bolts 27, by which the jaws of the chuck are fixed to the bed or base plate after having been clamped upon the inserted pair of brasses. The bolts 27 are entered from below, and their nuts 28 being loosened, they slide freely in the holes until the jaws have been closed, after which the nuts are brought to a tight bearing to hold the jaws firmly to the base-plate. The base-plate is secured to the face-plate of the drill-press by proper clamps.

I claim as my invention and desire to secure by Letters Patent—

1. The combination of a bed or base plate, a pair of clamping jaws or sections fitted to slide thereon, each of said jaws having its inner side faces inclined equally in opposite directions and recessed to admit outside shoulders of truck-brasses, clamping-bolts passing through bearings in one jaw and engaging nuts on the other, a pair of liners or distance-pieces adjusted centrally in the jaws parallel with the clamping-bolts, and an adjusting-screw mounted in a bearing on one of the jaws, said screw engaging a nut fixed to the bed-plate, and carrying a gear meshing with similar gears on the clamping-bolts, substantially as set forth.

2. The combination of a bed or base plate, a pair of clamping jaws or sections fitted to slide thereon, a pair of clamping-bolts passing through bearings in one jaw and engaging nuts on the other, and an adjusting-screw of reversed lead, and having double the number of threads relatively to the clamping-bolts, said screw being mounted in a bearing in one of the jaws, engaging a nut fixed to the bed-plate, and carrying a gear meshing with similar gears on the clamping-bolts, substantially as set forth.

3. The combination of a bed or base plate having a central opening for a boring-bar, a pair of clamping jaws or sections fitted to slide thereon toward and from said opening, and a casing fixed to the lower portion of one of the jaws and inclosing a channel or passage for carrying off chips or borings, substantially as set forth.

4. The combination of a bed or base plate having a central opening for a boring-bar, a pair of clamping jaws or sections fitted to slide thereon toward and from said opening, and a series of connecting-bolts passing through the jaws and through longitudinal slots or recesses in the bed-plate, substantially as set forth.

5. The combination of a bed or base plate having a central opening for a boring-bar, a pair of clamping jaws or sections fitted to slide thereon toward and from said opening, said jaws having their inner side faces inclined equally in opposite directions and recessed to admit outside shoulders of truck-brasses, a pair of removable liners or distance-pieces located centrally in the line of traverse of the jaws, and transverse set-screws engaging the jaws and bearing on the liners, substantially as set forth.

6. The combination of a bed or base plate having a central opening for a boring-bar, a pair of jaws having inclined inner faces and fitted to slide on the bed-plate toward and from said opening, a pair of liners or distance-pieces fixed centrally in the jaws, mechanism, as described, for clamping the jaws upon a pair of truck-brasses separated by the liners, and connecting-bolts passing through the bases of the jaws and through longitudinal slots in the bed-plate, and provided with nuts for fixing the jaws to the bed-plate when clamped in position for operation, substantially as set forth.

7. The combination of a bed or base plate having a central opening for a boring-bar, a pair of clamping jaws or sections fitted to slide on the bed-plate toward and from said opening, a thimble or boring-bar socket fitting said opening, a ring of rubber or analogous packing fixed on the top of said thimble, and an oil pipe or passage leading from one side of the bed-plate to a communication with the inner surface of the thimble below its packing-ring, substantially as set forth.

HENRY OTTO.

Witnesses:
WILLIAM B. CARLOCK,
CHARLES FREESE.